Dec. 10, 1940. S. M. CHARTOCK ET AL 2,224,215
BRAKE
Filed Aug. 6, 1938 2 Sheets-Sheet 1
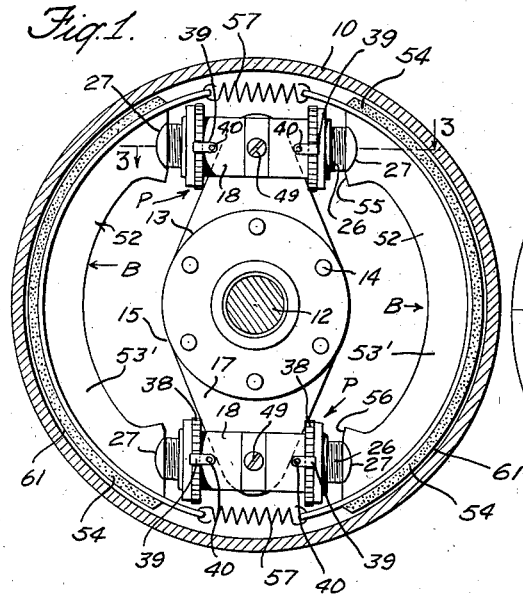
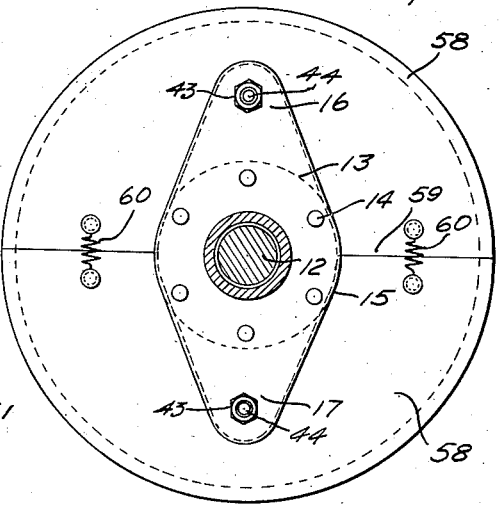
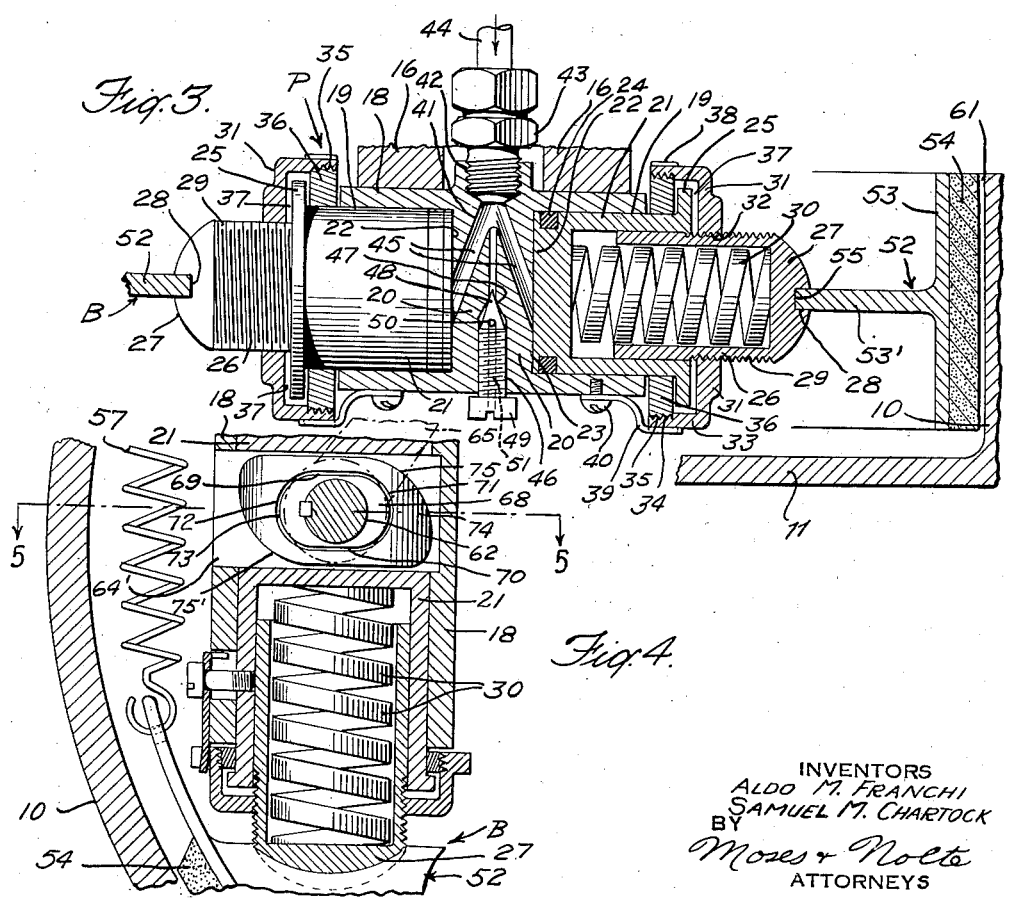
INVENTORS
ALDO M. FRANCHI
SAMUEL M. CHARTOCK
BY
Moses & Nolte
ATTORNEYS Dec. 10, 1940.  S. M. CHARTOCK ET AL  2,224,215
BRAKE
Filed Aug. 6, 1938   2 Sheets-Sheet 2

INVENTORS
ALDO M. FRANCHI
SAMUEL M. CHARTOCK
BY
Moses & Nolte
ATTORNEYS

Patented Dec. 10, 1940

2,224,215

UNITED STATES PATENT OFFICE 2,224,215

BRAKE

Samuel M. Chartock, Brooklyn, and Aldo M. Franchi, New York, N. Y.

Application August 6, 1938, Serial No. 223,402

20 Claims. (Cl. 188—152)

This invention relates to brakes and particularly to the operating means for brake shoes having expandible linings and our improvements are of particular utility when embodied in brakes for the wheels of automobiles, although we contemplate the use of our improvements in any field of use for which they are adapted by their nature.

The general object of the present invention is to provide a brake structure of the expanding shoe type with brake shoes arranged to be engaged with the inner peripheral surface of a drum and in which an operating means is provided which equalizes the braking effect of the shoes on the drum.

Another object of the invention is to provide means by which a set of brake shoes may be readily and quickly removed from the drum while the latter retains its position on the wheel or other rotary element of the mechanism which is controlled by the brake, as in an automobile.

Another object of the invention is to provide means by which such a readily removable and replaceable set of brake shoes may be adjusted with equal ease to vary the extent of clearance between the shoe members and the inner surface of the drum, so that as the friction liner becomes worn by use, the brake shoe may be set up nearer to the drum, and thus compensate for the wear as it proceeds, making it possible for the operator of the brake to work it by a uniform pressure upon the brake pedal, instead of a pressure acting through a short throw of the pedal when the brake is new and through a much wider throw as the linings become worn off.

Another object is to provide a novel form of hydraulic operating means for applying the braking pressure to a rotary device which it is desired to retard and in which one or more movable pistons used to actuate the brake are so disposed within a cylinder as to serve as valves which close ports through which the fluid under pressure enters the cylinders.

Still another object of the invention is to provide a novel form of cam actuating means for causing two slidable members which are connected to oppositely disposed brake shoes to apply equal pressure of increasing amounts to the brake shoes during the application of the brake.

A cognate object of the invention is to provide in connection with a hydraulic type of brake device, a cylinder having a pair of opposed pistons mounted therein, a partition wall being provided between the pistons and having a pair of passages or ports formed therein to admit the fluid to the pistons. In a preferred form of the invention, these ports are so dimensioned and inclined to each other as to provide a maximum resistance to the passage of fluid from one piston to the other thereby minimizing the backing up of fluid from one cylinder bore into the other.

Other objects and features of the invention will appear as the description of the particular physical embodiment of the invention selected to illustrate the invention proceeds.

In the accompanying drawings, like characters of reference have been applied to corresponding parts throughout the several views which make up the drawings, in which:

Fig. 1 is a sectional view taken through the brake drum of an automobile wheel brake in the construction of which the present invention is embodied;

Fig. 2 is a sectional view taken through the rear axle housing and looking towards the wheel, showing certain portions of the brake of Fig. 1;

Fig. 3 is a longitudinal sectional view on an enlarged scale of one of the hydraulic piston units shown in Fig. 1 showing also a portion of the brake shoe and drum;

Fig. 4 is a sectional view similar to Fig. 3 but showing a different form of operating means for displacing the pistons, a portion of one piston and the cylinder being broken off;

Figure 5:
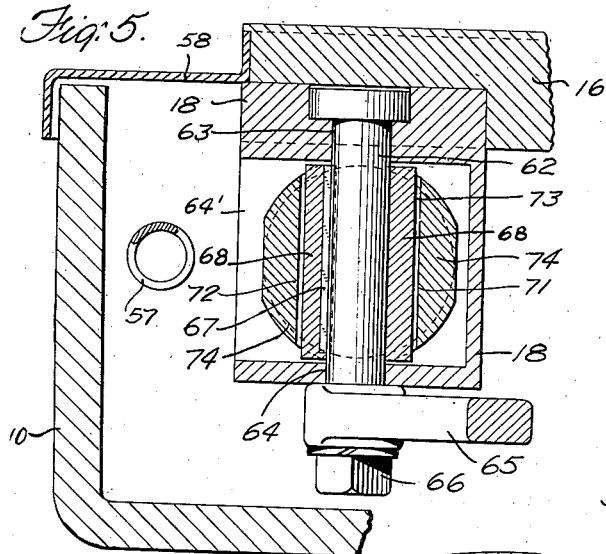
Fig. 5 is a sectional view taken on line 5—5 of Fig. 4.

Referring to Figs. 1 to 3, the part designated by numeral 10 is the drum member of one of the wheel brakes of an automobile and which is provided with an inwardly extending web portion 11 which is secured by conventional means (not shown) to the central drive shaft 12, so that it rotates with the wheel. Near the drum 10 the stationary axle housing which surrounds shaft 12 is provided with a flange portion 13 to which may be secured, as by rivets 14, a brake shoe supporting plate 15 having the radially disposed, oppositely extending arms 16 and 17. Secured near the end of each of the arms 16 and 17 by any desired means (not shown) is an opposed piston operating unit designated by reference character P, the function of which is to support the brake shoes and cause them to move into engagement with the drum 10 when it is desired to apply the brake. In the form of the invention shown in Figs. 1 and 3 each operating unit P is of the opposed piston, hydraulic type and comprises a cylinder 18 having opposed and aligned cylindrical bores 19, a centrally disposed partition 20, preferably formed integral with cylinder 18, separating the bores. A hollow piston member 21 is mounted for movement in each of the bores 19, these pistons being similar and each having a preferably flat solid end portion 22 which is adapted to seat firmly against the wall 23 of partition 20. Each piston is provided with an inset packing ring 24, which serves to prevent the passage of fluid past the piston, and the end of the piston is provided with a radially extending flange 25. Mounted for limited movement within the piston is a hollow sleeve member 26 having a solid end portion 27 provided with a slot 28 and an exterior threaded portion 29. A compression coil spring 30 has its ends in engagement with the solid end portions 22 and 27 of piston 21 and sleeve member 26 respectively. To provide for the adjustment of sleeve 26 with reference to piston 21, a nut member 31 is provided interiorly threaded as at 32 to engage threaded portion 29 of sleeve 26 and having an extension in the form of an annular flange 33 threaded as at 34 to engage the threaded periphery 35 of a disc 36 which is bored for sliding engagement with the outer surface of piston 21. For the operation of the device in the preferred manner, a suitable clearance space, indicated at 37, is provided between the flanged end 25 of piston 21 and nut 31, this clearance being adjustable by rotation of nut 31.

In order to hold nut 31 in adjusted position, it may be provided with small projections as at 38, between which a flexible member, such as a spring 39 seats, the spring 39 being secured to cylinder 18, as by a screw or rivet 40.

In order to apply fluid pressure to the pistons, partition 20 is provided with a radial bore 41 which terminates in a threaded bore 42 in the cylinder 18, a coupling member 43 which is carried by the end of the fluid supply pipe 44, being screwed into bore 42 to provide a fluid tight connection. A suitable fluid of the type usually used in hydraulic brakes is supplied under pressure to pipe 44 by the conventional means (not shown). Oppositely inclined ports or passages 45, disposed as shown, are formed through partition 20 to connect passage 41 with cylinder bores 19. In order to allow air to escape from the system upon its installation or repair, a threaded bore 46 is provided, the inner end of which provides a conical valve seat 47 adapted to be engaged by the conical shaped end 48 of a valve screw 49 adapted to engage threaded bore 46. Valve screw 49 is provided with a small central bore 51 terminating in a radial passage 50. In the position shown in Fig. 3, the valve 49 effectively closes the opening into the passage 45 to prevent the escape of the contained fluid. Upon turning valve screw 49 to withdraw conical valve end 48 from seat 47 a slight amount, the contained air will pass out through passage 51—50.

As shown in Fig. 1 the end portions of sleeves 26 form the sole supporting means for a pair of oppositely disposed brake members B, each comprising a metallic brake shoe 52 of generally T shaped cross section (see Fig. 3) the outer flange portion 53 of which is substantially parallel to the surface of brake drum 10 and has secured thereto by any conventional means (not shown) an expendable friction liner 54. The inwardly extending web portion 53' of each shoe 52 terminates in vertically disposed ends 55, 56 which enter the slots 28 provided in sleeves 26 as shown in Fig. 3. In order to retain the shoes 52 in position, their end portions are connected to the opposite ends of tension springs 57 (Fig. 1).

In order to close the open end of the brake drum so that dust, dirt, etc. will be excluded from its interior and the working parts contained therein, we provide a pair of mating dust plates 58 of the type disclosed in patent application Serial No. 95,811 filed August 13, 1936, now Patent No. 2,158,818, dated May 16, 1939. The plates 58 abut each other along their diametral edges 59 and are yieldingly held together by a pair of tension springs 60.

In the preferred embodiment of the invention, a small clearance space 61 is provided between the outer peripheral surface of the brake linings 54 and drum 10, so that normally no braking action occurs. The operating parts are also so proportioned that clearance space 37 between piston 21 and nut 31 is somewhat greater than clearance space 61. With the parts in the normal position shown in Fig. 3, springs 30 serve to maintain the solid end portions 22 of pistons 21 in contact with the walls of partition 20, substantially no fluid being within the bore 19 of cylinder 18, and the pistons 21 serving to close the fluid passages 45, thereby preventing the slow leakage of fluid out along the peripheral surfaces of pistons 21. In other words the pistons 21 which serve to actuate the brake shoes B also serve as means to seal the open end of the pressure fluid system, as embodied in passages 45, so as to prevent the leakage of fluid therefrom.

To apply the brake, the operator depresses a foot pedal which through conventional means (not shown) causes the fluid within ports 45 to move pistons 21 outwardly, springs 30 causing sleeves 26 to advance the friction linings 54 against the drum surface 10. Further motion of pistons 21 causes an increasing yielding pressure to be exerted against the drum 10 through the action of springs 30 which are gradually compressed while pistons 21 are moving along sleeves 26 to take up the clearance space 37, upon which the contact of flange 25 with nut 31 provides rigid, metallic driving connection between pistons 21 and brake shoes 52. To apply the full braking effect only a small motion, of the order of one eighth inch, is required of each piston and during the initial part of this motion the driving connection between each piston 21 and brake shoe 52 is a yielding one, the driving connection being a rigid one during the rest of the piston's motion. It is further to be noted that since the cylinder and piston structure is symmetrical, the same pressure is applied to each piston 21 so that a perfectly balanced braking action results due to equal pressures being applied to shoes 52. Upon release of the fluid pressure, shoes 52 are moved inwardly under the bias of springs 57, the fluid in cylinders 18 returning to pipe 44 through the ports 45. The clearance space 61 between the upper or lower ends of a friction liner 54 and drum 10 may be adjusted to any desired value by adjustment of the nuts 31 so that these nuts provide an adjustment means whereby the outer surface of a liner 54 may be disposed exactly parallel to the interior surface of drum 10. Nuts 31 also provide a ready means for equalizing the clearance spaces 61 between the friction liners 54 and drum 10.

It is to be further noted that the construction above described provides for ready removal of the shoes 52 in order to replenish their liners 54. For this purpose dust plates 58 are spread apart against the bias of springs 60 and slid along the vehicle axle to expose the parts within brake drum 10. Upon unhooking one end of each spring 57 and pressing the sleeves 26 inwardly by rotating the adjusting nuts 31 until their ends clear the end portions 55 and 56 of the brake shoes 52, the latter, with their attached liners 54, may be readily removed from the open end of drum 10, since the end portions 55 and 56 of the brake shoes 52 are now entirely clear of the slots 28 and the sleeves 26, permitting the operator to move each shoe 52 parallel to the shaft 12 and withdraw it through the open end of brake drum 10.

In the modified form of the invention shown in Figs. 4 and 5 the general arrangement and disposition of parts are the same as above described in connection with Fig. 1 but the pistons are arranged vertically and the brake shoes B engage the upper and lower portions of drum 10 and also instead of a hydraulic means for actuating the pistons 21, we provide a mechanical means comprising a centrally disposed shaft 62 journalled in the spaced apart bearings 63 and 64 formed in cylinder 18 which is provided with a large opening 64' between the pistons 21. Any suitable means may be provided for rotating shaft 62, that shown comprising an arm 65 whose end portion is secured to shaft 62 as by a nut 66. The arms 65 may be actuated in any suitable manner as by means of fluid actuated pistons slidable in a cylinder located within the drum 10 in a manner to be later described in connection with the arms 78 of Fig. 6. Secured to shaft 62 as by a key 67 is a cam operating member 68 of generally elongated form as shown in Fig. 4 and having parallel upper and lower walls 69, 70 connected by the substantially semi-cylindrical end walls 71, 72. Surrounding cam operator 68 and spaced therefrom by a small clearance space 73 is a cam member 74 having the shape shown in Fig. 4 and providing a pair of cam faces 75 and 75' adapted to engage and operate the pistons 21. The central opening in cam 74 is thus shaped to conform to the outer surface of cam operator 68, as defined by its walls 69, 70, 71, 72.

To apply the brake, arm 65 is rotated under control of the brake pedal by any known suitable connecting means (not shown) which causes rotation of shaft 62, cam operator 68 and cam 74 counterclockwise in Fig. 4 causing cam surfaces 75 and 75' to operate pistons 21 which operate to cause the friction liners 54 to engage and press against drum 10 in the same manner as above described in connection with Figs. 1 and 3. This arrangement also serves to apply equal braking forces to the brake shoes 52 as does the hydraulic actuating means previously described; since in all positions of adjustment of cam operator 68, the cam 74 may slide thereon and this action will take place whenever the inward pressure of one piston 21 against cam 74 exceeds that of the other piston. Whenever these pressures are unequal, cam 74 is moved along cam operator 68 in the direction of the piston exerting the least pressure on it until the pressure between the two pistons 21 is again equalized. This novel means for equalizing the pressure between the two brake shoes results in a uniform braking force being applied to the opposite sides of drum 10 and equal wear of the friction liners 54.

Figure 7:
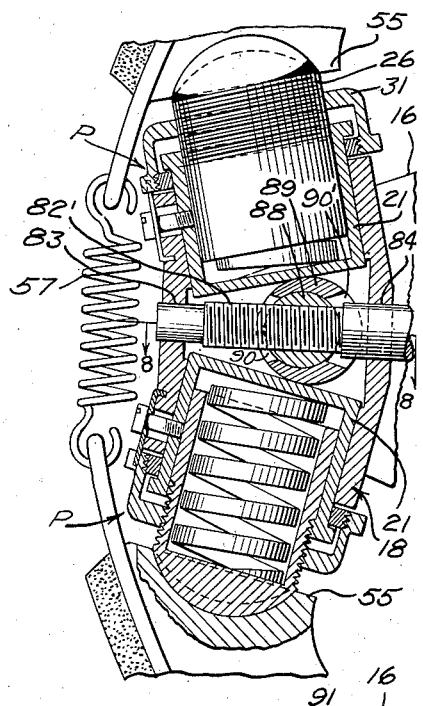
Fig. 7 is a longitudinal sectional view on an enlarged scale of the piston unit of Fig. 6 also showing portions of the brake shoes and associated parts.
Figure 6:
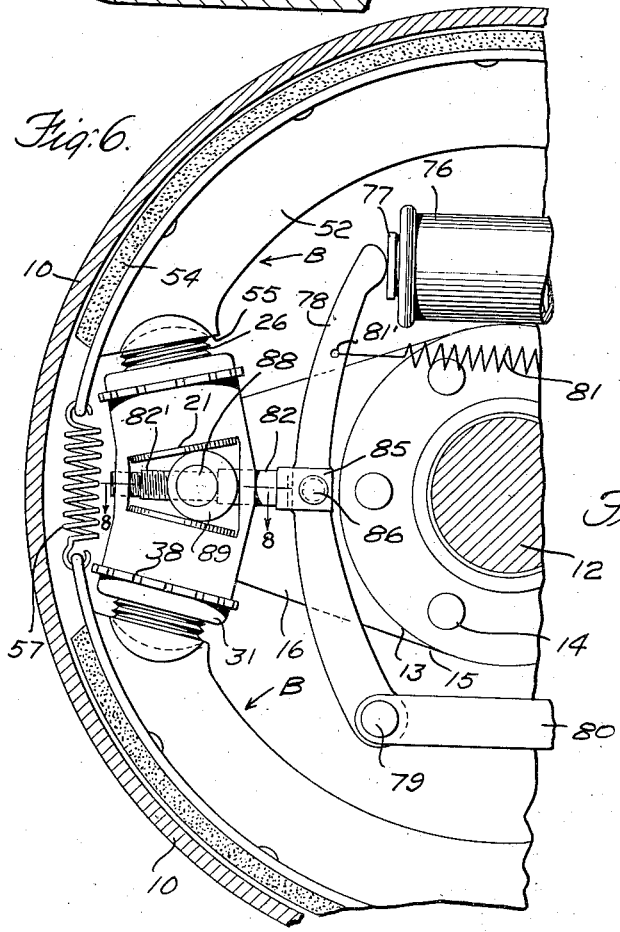
Fig. 6 is a fragmentary sectional view taken through the brake drum of an automobile wheel brake embodying a different form of the invention and showing substantially only one half of the braking device.
Figure 8:
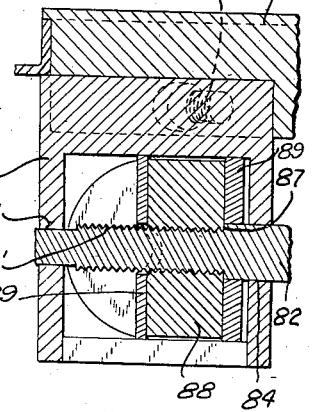
Fig. 8 is a sectional view taken on line 8—8 of Fig. 7.

Another embodiment of the invention, especially adapted for heavy duty, such as on automotive trucks and similar service where powerful braking action is required is shown in Figs. 6, 7 and 8. The general arrangement here is similar to that shown in Fig. 4 with the piston operating unit P arranged vertically and its supporting arm 16 horizontal, only one half of the brake drum and the brake actuating instrumentalities being shown, it being understood that the other half is similar in every respect to that shown. A horizontally disposed hydraulic cylinder 76 supported within brake drum 10 by any suitable means (not shown) is provided at each end with a movable piston 77 which engages the upper end of a floating lever 78, the lower ends of levers 78 being pivotally connected as by pins 79, to the ends of a horizontally disposed connecting link 80. A tension spring 81 has its opposite ends secured to levers 78 as at 81' and serves to bias the levers and pistons 77 toward their inner positions. A rod 82 mounted for sliding movement within spaced apart bearings 83 and 84 formed in the walls of cylinder 18 is provided with a forked end member 85 the inner sides of which engage the opposite faces of lever 78 and to which member 85 is pivotally connected by a pin 86. Between bearings 83 and 84 rod 82 is provided with a cylindrical threaded portion 82' of reduced diameter to thereby provide a shoulder 87 adapted to engage a transversely extending cylindrical pin 88 which is interiorly bored and threaded to be screwed onto threaded portion 82' of pin 82.

Mounted for pivotal movement on pin 88 is an eccentric 89 provided with oppositely disposed slots 90 and 90' through which rod 82 extends, the slots 90 and 90' forming an opening through the eccentric member 89 to permit its rotation to a limited extent on pin 88. With the pistons 21 in their inner positions as shown in Fig. 7, their ends are in engagement with eccentric 89 and the slots 90 and 90' are symmetrically disposed with reference to rod 82. Except as to the eccentric operating means just described, the construction of each piston operating unit P is the same as that above described in connection with Figs. 1 to 3. A screw 91 is shown in Fig. 8 as a securing means for securing cylinder 18 to supporting arm 16.

In the operation of this form of the invention, upon the depression of the brake pedal, hydraulic pressure within cylinder 76 causes pistons 77 to move outwardly thereby rotating each of the levers 78 on its pivot pin 79 against the bias of spring 81. The outward movement of lever 78 causes rod 82 to slide in its bearings 83, 84 and advance pin 88 and eccentric 89 the upper and lower surfaces of which act as cam surfaces to spread pistons 21 apart and apply braking pressure to drum 10 in the same manner as above described in connection with Fig. 3. Should the pressure of one of the pistons 21 tend to exceed that of the other on eccentric 89, it will cause the eccentric to rotate slightly on its supporting pin 88 thereby reducing the pressure on one piston and simultaneously increasing it on the other. In the operation of this form of the invention also, the pressure between the brake shoes is equalized resulting in a uniform braking action and equal wear of the friction liners 54.

We have described what we believe to be the best embodiments of our invention. We do not wish, however, to be confined to the embodiments shown, but what we desire to cover by Letters Patent is set forth in the appended claims.

We claim:

1. A brake of the class described comprising the combination of a drum, a set of braking devices, a set of stationary cylinders mounted within the drum, two oppositely disposed pistons in each of said cylinders, a hollow sleeve slidable in each of said pistons and having a threaded end portion, a compression spring yieldably urging each of the sleeves toward said drum, nuts adapted to engage the threaded end portions of said sleeves and positioned for adjustable driving engagement with the ends of the pistons, means supporting the end portions of the braking devices on said sleeves and means for moving the pistons along the cylinders to cause the braking devices to engage the drum.

2. A brake as claimed in claim 1 in which the end portions of said sleeves are provided with grooves and the braking devices are provided with inwardly extending webs seated in said grooves.

3. In a braking mechanism having a rotary member to be retarded and a brake device, means for actuating the brake device into engagement with the rotary member comprising in combination, a cylinder provided with a bore and a transversely extending wall having a port opening therein, a piston slidable in the cylinder bore and arranged to close said port opening at an end position thereof, a sleeve slidable in said piston, a compression spring interposed between said sleeve and piston, means connecting said sleeve to the brake device and means for supplying fluid under pressure to said port opening.

4. In a braking mechanism having a rotary member to be retarded and a brake device, means for actuating the brake device into engagement with the rotary member comprising in combination, a cylinder provided with a pair of aligned bores and a transversely extending partition formed integral with the cylinder between the bores, said partition being provided with a passageway terminating in oppositely disposed ports in communication with the cylinder bores, pistons slidable in the cylinder bores, yielding means for normally maintaining the pistons in engagement with said partitions to close the ports therein, means for connecting said pistons to the brake device comprising a pair of members slidable along said pistons and engaging said yielding means and means for supplying fluid under pressure to the passageway in said partition.

5. A braking mechanism as claimed in claim 4 in which the means for connecting the pistons to the brake device comprises a sleeve slidable in each piston and a web formed integral with the brake device and in supporting engagement with the sleeve.

6. In a braking mechanism having a rotary member to be retarded and a brake device, means for actuating the brake device into engagement with the rotary member comprising in combination, a cylinder provided with a bore and a journal bearing, a piston slidable in the cylinder bore and having a solid end wall, means connecting said piston to the brake device and including a yieldable member and means for moving said piston along the bore and comprising a shaft journalled in said bearing, a supporting member secured to said shaft, a member mounted for limited sliding movement on said supporting member and having a cam surface in contact with the solid end wall of said piston and means for moving said shaft.

7. In a braking mechanism having a rotary member to be retarded and a brake device, means for actuating the brake device into engagement with the rotary member comprising in combination, a cylinder provided with a pair of aligned bores and a centrally disposed journal bearing, a piston slidable in each of said cylinder bores, means connecting said pistons to the brake device and means for moving said pistons along the cylinder bores comprising a shaft disposed between the bores and journalled in said bearing, a member secured to said shaft and having parallel side walls and convexly curved end walls connecting said side walls; a cam member having an opening therein through which said last named member passes, the dimensions of said opening being slightly larger than those of said member whereby the convexly curved end walls of said member engage the correspondingly curved bounding walls of the opening in the cam member, said cam member having a pair of cam surfaces arranged to directly engage said pistons and means for rotating said shaft.

8. In a braking mechanism having a rotary member to be retarded and a brake device, means for actuating the brake device into engagement with the rotary member comprising in combination, a cylinder provided with a bore and a bearing, a piston slidable in the cylinder bore, means connecting said piston to the brake device and means for moving said piston along the cylinder bore comprising a rod disposed in said bearing, an eccentric having its peripheral surface in engagement with said piston and means connecting said eccentric and rod arranged to permit a limited movement of the eccentric with reference to the rod, and means for sliding the rod within said bearing.

9. A braking mechanism as claimed in claim 8 in which the means connecting the eccentric and rod comprises a pin secured to the rod and extending transversely thereof and on which the eccentric is pivotally mounted.

10. In a braking mechanism having a rotary member to be retarded and a brake device, means for moving the brake device into engagement with the rotary member comprising in combination, a cylinder provided with a pair of bores and a bearing disposed between said bores, a piston slidable in each of said cylinder bores, means connecting said pistons to the brake device and means for moving the pistons along the bores comprising a rod disposed in said bearing, a pin secured to said rod and extending transversely thereto, an eccentric mounted on said pin and having opposite portions of its surface in engagement with said pistons and means for sliding said rod within said bearing.

11. A braking mechanism as claimed in claim 10 characterized by said eccentric having a slotted opening through which said rod passes, the dimensions of said opening being such as to provide for a limited pivotal movement of the eccentric on said pin.

12. In a braking mechanism having a rotary member to be retarded and a brake device, means for moving the brake device into engagement with the rotary member comprising in combination, a cylinder provided with a pair of bores and a bearing disposed between said bores, a piston slidable in each of said cylinder bores, a sleeve slidable in each of said pistons, a compression spring interposed between each of said pistons and its sleeve, means connecting the outer end portions of said sleeves to the brake device and means for moving the pistons along the bores comprising a rod disposed in said bearing, a pin secured to said rod and extending transversely thereof, an eccentric pivotally mounted on said pin and having an opening through the center portion dimensioned so as to permit a limited motion of the eccentric with reference to the rod and substantially opposite portions of the eccentric being in engagement with said pistons and means for sliding said rod within said bearing.

13. In a device of the class described the combination of a drum, a brake shoe disposed within the drum, a cylinder mounted within the drum, a piston slidable within said cylinder, means for admitting fluid under pressure to the interior of said cylinder and means connecting said piston to one end of said brake shoe arranged to apply a yielding pressure to the brake shoe until it engages the drum and to apply an unyielding pressure thereto after its engagement with the drum said connecting means comprising a member slidable along said piston and screw means for adjusting the clearance space between said slidable member and said piston.

14. A brake of the class described comprising the combination of a drum, a set of oppositely disposed braking devices, a set of stationary cylinders mounted within the drum, two oppositely disposed pistons mounted in each of said cylinders, means for actuating said pistons along their cylinders, and means connecting the pistons to the braking devices arranged to apply a yielding pressure thereto during the initial portion of the motion of the pistons and to apply an unyielding pressure thereto during the remaining portion of the pistons' motion.

15. A brake of the class described comprising the combination of a drum, a set of braking devices, a set of cylinders mounted within the drum, two oppositely disposed pistons mounted in each of said cylinders, a hollow sleeve slidable in each of said pistons, a compression spring within each of said pistons and adapted to move its sleeve towards the drum, each of said sleeves being provided with an abutment normally spaced from an end portion of its piston and adapted for positive driving engagement thereby upon compression of the spring to a limited extent, means connecting the end portions of said braking devices to said sleeves and means for moving the pistons along the cylinders to move the braking devices into engagement with the drum.

16. In a brake of the class described, the combination of a drum, a braking device, a cylinder disposed within the drum, a piston slidable along said cylinder, a member slidable within said piston, a compression spring biasing said slidable member away from said piston, said slidable member having a threaded end portion, a nut adjustable along said threaded end portion and adapted to be engaged by the piston upon compression of said spring to a predetermined extent, means connecting said slidable member with one end of the braking device and means for supplying fluid under pressure to said cylinder.

17. In a braking mechanism having a rotary member to be retarded and a brake device, in combination, means for actuating the brake device into engagement with the rotary member comprising a cylinder provided with a pair of oppositely disposed bores and a centrally disposed journal bearing, a piston slidable in each of said cylinder bores, means connecting said pistons to the brake device and comprising a spring disposed in each cylinder bore and arranged to urge the piston therein inwardly toward said journal bearing, and means for moving said pistons along the bores and comprising a shaft extending transversely to the cylinder bores and journalled in said bearing, a supporting member secured to said shaft, a member mounted for limited sliding movement on said supporting member and having a pair of cam surfaces in contact with said pistons and means for actuating said shaft.

18. In a braking mechanism having a rotary member to be retarded and a brake device, means for actuating the brake device into engagement with the rotary member comprising in combination, a cylinder provided with a pair of aligned bores and a transversely extending partition between the bores, said partition being provided with a radial aperture extending between opposite walls thereof and a pair of oppositely inclined passages connecting said aperture with the cylinder bores, a fluid supply conduit connected to one end of said radial aperture, an adjustable valve seated in the other end of said radial aperture, pistons slidable in the cylinder bores, yielding means for normally maintaining the pistons in engagement with the walls of said partition and means connecting said pistons to the brake device.

19. The combination as set forth in claim 18 in which the adjustable valve comprises a screw member provided with a longitudinal aperture extending from one end to a point spaced from the opposite end and a radial aperture extending from the last named end of the longitudinal aperture to the surface of the screw.

20. In a braking mechanism having a rotary member to be retarded and a brake device, means for actuating the brake device into engagement with the rotary member comprising, in combination, a cylinder provided with a curved wall, a piston slidable along the cylinder wall, means connecting said piston to the brake device and means for moving said piston along the cylinder wall comprising a threaded rod, a pin arranged transversely of said rod and having a threaded bore engaging said rod, an eccentric pivotally mounted on said pin and having a portion of its peripheral surface in driving engagement with said piston and means for reciprocating said threaded rod.

SAMUEL M. CHARTOCK.
ALDO M. FRANCHI.